United States Patent [19]
Sterriti

[11] 3,774,318
[45] Nov. 27, 1973

[54] DIRECTIONALITY TRAINER

[76] Inventor: Graham M. Sterriti, 1202 W. Abriendo Ave., Pueblo, Colo. 81004

[22] Filed: Nov. 1, 1972

[21] Appl. No.: 302,730

[52] U.S. Cl. .................................. 35/35 R, 35/9 C
[51] Int. Cl. .......................................... G09b 17/00
[58] Field of Search .................... 35/35 R, 35 H, 37, 35/9 C

[56] References Cited
UNITED STATES PATENTS

| 3,672,074 | 6/1972 | Huffstetter | 35/35 H |
| 3,683,516 | 8/1972 | Fass | 35/37 |
| 3,690,020 | 9/1972 | McBratnie | 35/37 |

*Primary Examiner*—Wm. H. Grieb
*Attorney*—William E. Anderson et al.

[57] ABSTRACT

A directionality trainer trains a student to make sequential perceptual motor scribing responses in accordance with the conventions appropriate for the relevant language, e.g., in lines from left to right with the lines sequentially arranged from top to bottom. A visual-kinesthetic sequence tracing board has a plurality of stations, as in the form of metallic segments, spatially arranged in accordance with this convention. A sequencing means, such as one comprising a digital counter, has a plurality of unique output states each corresponding to a respective one of the board stations. Each time the sequencing means is actuated, it advances from one state to the next in the same sequence as the corresponding stations are arranged. As the student scribes the tracing board, a comparator compares the state of the sequencing means with the station touched by the student. A comparison signal is applied to display means which provides feedback to the student as to whether or not he is performing correctly in conventional sequence.

16 Claims, 3 Drawing Figures

Patented Nov. 27, 1973  3,774,318

DIRECTIONALITY TRAINER

This invention relates generally to teaching aids, more specifically to a directionality trainer providing, to students of reading and writing, opportunities for perceptual-motor scribing responses in association with the graphic symbols of a given language, and still more specifically to a device for teaching a student to begin at the top left corner of a block of graphic language and proceed systematically from left to right through successive lines of print from top to bottom as is required for Western languages such as English.

Written communication is dependent upon conventional, systematic organization. It will not do to have graphic symbols randomly disposed, nor will it do for a reader to proceed randomly about a printed page. Written communication requires that the graphic symbols be coded and decoded systematically following an established convention. In Western languages, the common convention is for the symbols to be displayed from left to right in ordered lines with the lines proceeding from top to bottom. Reading the symbols, that is, letters and words, in this order communicates to the reader the information set out by the writer in that same order.

There is no innate tendency to approach spatial configurations in the specific sequence required for correct reading and writing of any language. Indeed, not all languages follow the above convention. For example, Chinese order their symbols vertically, and in Hebrew the writing proceeds from right to left. It is thus necessary that a student learn to arrange the page in the manner appropriate to the particular language he wishes to read or write. To read and write a language, one must learn to proceed over the page in accordance with the convention for that language. Reading disorders persisting into upper primary schools and even into secondary schools frequently involve spatial orientation or directionality problems, particularly those involving difficulty in telling left from right and the consequent difficulty in proceeding from left to right in reading and writing.

It has been discovered that physical motion is helpful in the learning of directionality. More particularly, it has been discovered that reading directionality can be learned more readily if a child is taught to move his hand across a page in accordance with the convention for writing the language to be read. In the case of Western languages such as English, the present invention teaches the student to coordinate his eyes and hand to begin at the top left corner of a page and to proceed systematically from left to right on the top line of the page and then to proceed from left to right on successive lines down the page. The device then develops in the student the habit of proceeding with reading in accordance with this system. It may be used even before introduction of formal reading instruction. The invention therefore is intended to be a routine aid to the preshcool, kindergarten and the first grade student and for remedial work for students in higher grades.

The device is designed to stimulate young children to perform the desired task with minimum attention from a teacher and to provide instant, automatic feedback to the pupil as to the correctness of his performance.

The device of the present invention includes a console on the top or face of which is disposed a visual-kinesthetic sequence tracing board on which graphic symbols are arranged in accordance with the conventions appropriate for the relevant language. More particularly, in accordance with Western languages such as English, the graphic symbols are letters formed in left-to-right order into words sequentially arranged in lines from left to right with the lines sequentially arranged from top to bottom.

The visual-kinesthetic sequence tracing board has graphic symbols, e.g., words, written thereon in accordance with the spatial conventions of the given language. The surface of the board has a plurality of stations, as in the form of metallic segments, disposed thereon for touching by the student and associated with respective portions of the written matter and spatially arranged in accordance with this same convention. A sequencing means, such as one comprising a digital counter, has a plurality of unique input or output states each corresponding to a respective one of the board stations. Each time the sequencing means is actuated, it advances from one state to the next in the same sequence as the corresponding stations are arranged. As the student scribes the tracing board, a comparator compares the state of the sequencing means with the station touched by the student and in response to such comparison actuates the sequencing means and produces an evaluation signal indicating whether or not the student is touching the stations in conventional sequence. The evaluation signal is applied to display means which provides feedback to the student as to whether or not he is performing correctly in conventional sequence. Should the student follow any other sequence in touching the respective stations of the visual-kinesthetic sequence tracing board, the comparator notes the lack of correspondence between the station touched and the state of the sequencing means, and the evaluation signal thereupon produced causes the display means to indicate to the student that he has erred.

It is therefore an object of the present invention to provide a device for teaching directionality skills required for reading. It is a further object of the present invention to provide a device for teaching the student sequential perceptual-motor scribing responses in accordance with the convention required for reading and writing a particular language. It is another object of the present invention to provide a device visually observable by a student and operable by the movement of the student's hand over it and providing an indication to the student as to whether or not he is following the conventional sequence for the reading of a particular language.

Other objects and advantages of the present invention will be evident from the following detailed description, particularly when taken in conjunction with the appended drawings, in which.

Figure 1:
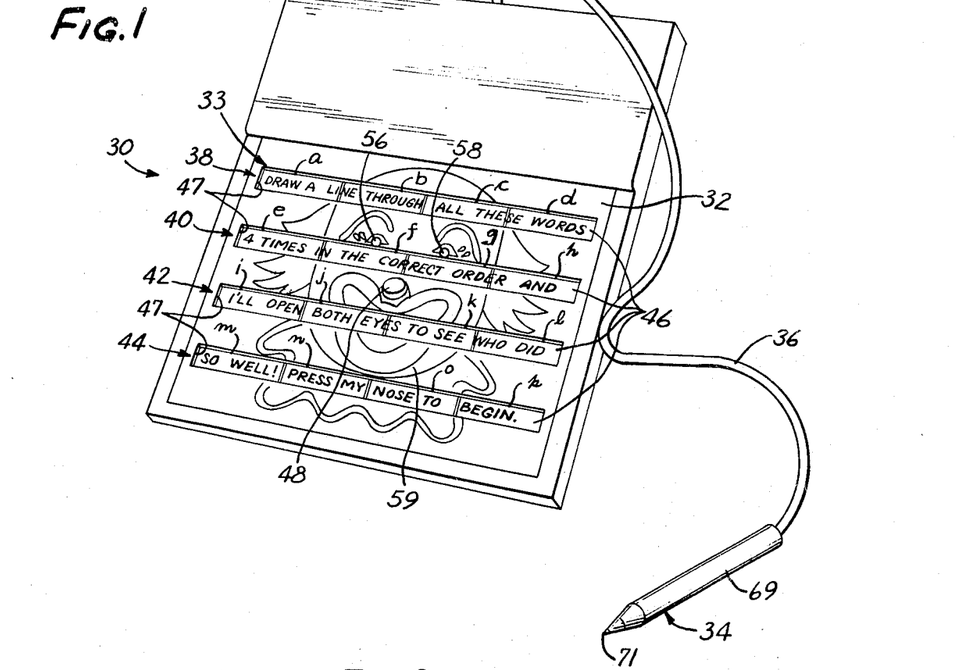
FIG. 1 is a perspective view of one form of the directionality trainer of the present invention.
Figure 2:
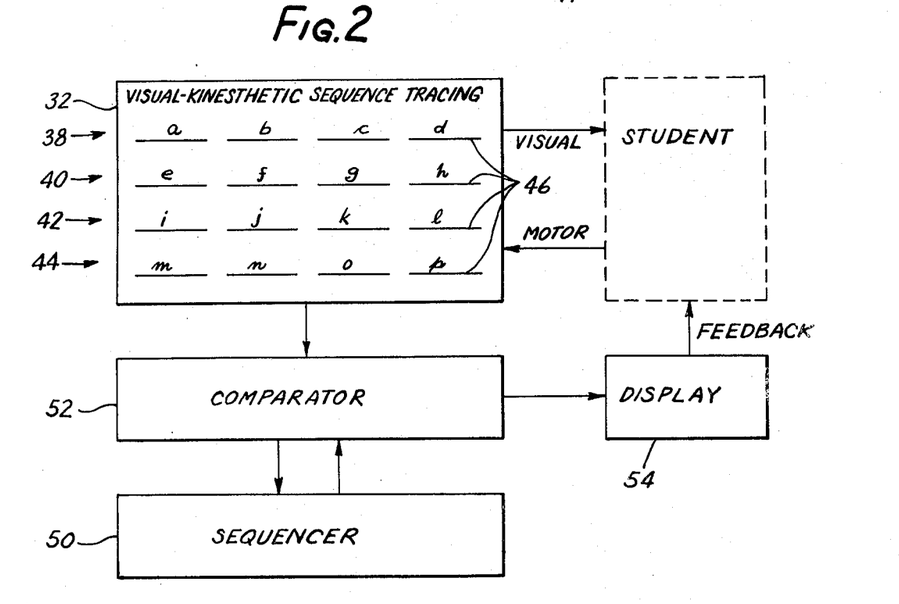
FIG. 2 is a diagrammatic illustration of the functional units of the invention illustrated in FIG. 1.

In the form of the invention particularly illustrated, a console 30 has on its top or face a visual-kinesthetic sequence tracing board 32. A stylus, scribe or probe 34 is electrically connected to the console 30 by a cable 36. The console 30 contains various logic and other circuits for determining whether or not a student performs properly in moving the stylus 34 across the surface of the visual-kinesthetic sequence tracing board 32. The circuitry is illustrated in block diagram form in FIG. 2 and in greater detail in FIG. 3. Graphic symbols 33 are printed on the face of the visual-kinesthetic sequence tracing board 32 using the conventions of the particular language, in this case, English. A message is thus disposed in lines 38, 40, 42 and 44 extending horizontally from left to right across the board 32 and reading successively from top to bottom. As illustrated, the graphic symbols are written at successive stations upon electrically conductive segments 46a–p insulated from one another but connected to internal electronic circuitry. These stations and segments are preferably disposed in respective shallow recesses or slots 47 in the surface of the visual-kinesthetic sequence tracing board 32. This provides raised edges along the margins of each line of printing which aid young children and those with motor problems, by helping to guide the stylus. The student must aim the stylus accurately to strike each successive line initially at the left and must thereafter scribe accurately from left to right; however, the guides greatly reduce the motor control needed to cope with the task and have been found to make the learning an easier and more pleasant experience.

The student with stylus 34 in hand observes the visual-kinesthetic sequence tracing board 32, noting the lines 38, 40, 42 and 44 of graphic symbols 33. He can see that the symbols are arranged in lines and that the lines are discrete. He may or may not observe the individual conductive segments 46a–p, as the symbols are more evident than the individual segments. However, he can see that the graphic symbols extend over the entire lines. Pursuant to instruction or demonstration, the student actuates the device by pressing a pushbutton 48 and then scribing the segments 46 with the stylus 34. The instructions are to trace or scribe the lines sequentially from left to right on each line, scribing the four lines successively from the top line to the bottom one. The instructions may, as shown, be written as the lines 38, 40, 42 and 44 of graphic symbols 33 and may comprise the following message.

"Draw a line through all these words 4 times in the correct order and I'll open both eyes to see who did so well! Press my nose to begin."

The student normally will be unable to read the instructions, or he would not require the training afforded by the device. However, the teacher may read the message to him, pointing out the proper sequence, and the presence of the instructional message will reinforce the learning process.

As promised by the instructions, the device of the present invention monitors the student's performance and informs him whether or not he has performed properly. The device illustrated includes (FIG. 2) a sequencing means 50 comprising an electronic digital counter having a plurality of unique output states each corresponding to a respective segment 46a–p. Each time the counter is actuated, it advances from one state to the next in the same sequence as the corresponding segments are arranged, that is, in the conventional reading order of the language involved, namely, for English, left to right and top to bottom. The counter also provides an output signal indicative of its state. When the student takes the probe 34 in hand and touches or scribes a particular segment 46a–p, a comparator 52 compares the state of the sequencing means 50 with the position of the stylus 34 on the tracing board 32, that is, which segment 46a–p is being touched. Depending upon whether or not the state of the sequencing means 50 corresponds with the position of the stylus 34, the comparator actuates the sequencing means 50 once to advance it to its next state and applies an output signal to a display unit 54. As illustrated, the display unit 54 comprises lamps 56 and 58 on the tracing board 32. Depending upon the programing of the display unit, one lamp may indicate whether or not the student is performing properly, and the other lamp may indicate when he has completed the proper scribing of all segments in succession a predetermined number of times. This information is observed by the student and constitutes both information and a reward encouraging proper performance. To stimulate the student's interest, the display unit may be made decorative and entertaining, as by depicting the face of a clown 59 on the tracing board and having the pushbutton 48 for his nose and the lamps 56 and 58 for his eyes.

Figure 3:
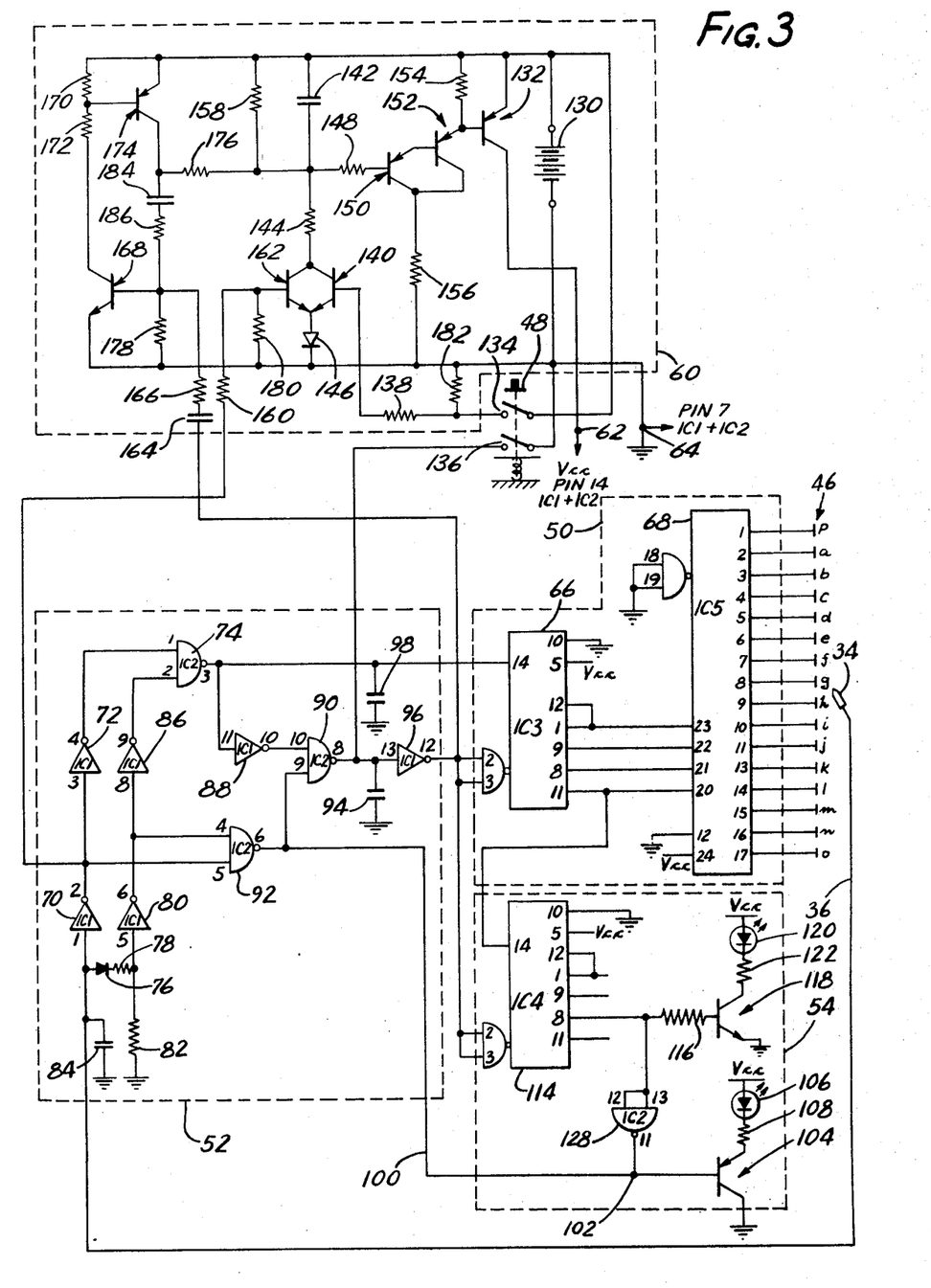
FIG. 3 is a diagrammatic illustration of the device illustrated in FIG. 1, showing the logic and other circuitry utilized in a preferred form of the invention.

FIG. 3 illustrates a preferred embodiment of the response sequence evaluation circuit of the present invention. It is in part schematic and in part a logic diagram. The necessary operating voltages (Vcc) for the various logic circuits are provided by a power supply 60 on an output terminal 62 with ground at a grounded terminal 64. The logic units are contained in integrated circuits with the terminals identified by the pin numbers for the particular integrated circuits used in constructing an actual operating unit, wherein the inverters indicated as IC1 comprise a hex-inverter MC836, and the NAND gates indicated as IC2 are formed from quad two-input NAND gates MC846. IC3 and IC4 are four-bit binary counters SN7493. IC5 is a 4 line to 16 line (1 of 16) decoder SN74154.

With the connections as indicated in FIG. 3, the sequencing means 50 comprises a four-bit binary counter 66 (IC3) and a 4 line to 16 line decoder 68 (IC5). With these units connected as shown, the four-bit binary counter 66 is reset to its first state by a reset signal applied to terminals 2 and 3 and thereafter advances one count at a time to successive states repetitively over a 16 state cycle. When coupled as shown to the 4 line to 16 line decoder 68, the counter 66 causes the output terminals of the decoder to be grounded successively one at a time. The 4 line to 16 line decoder 68 has 16 outputs connected as shown respectively to conductive segments 46a–p of the tracing board 32. When the counter 66 is reset, segment 46p is grounded while segments 46a–p are at the supply voltage Vcc. As the counter advances through successive states, the segments 46a–p are successively and sequentially grounded one at a time in alphabetical order a to p.

When the student manually moves the probe 34 to contact a particular segment 46a–p, the comparator circuit 52 determines whether or not the physical position of the probe 34 is in contact with that segment of segments 46a–p that is grounded by the operation of the sequencing means 50. In this way, the comparator 52 compares the position of the stylus 34 with the state of the sequencing means 50. The stylus 34, while functioning mechanically as part of the motor input from the student, is also functionally a probe for the comparator 52 to which it is connected by the cable 36. As shown, the stylus 34 itself has an insulated handle 69 and a conductive tip 71, with the tip connected to the conductor of the cable 36. Thus, when the tip 71 of the stylus 34 is touching the segment 46a–p corresponding to the grounded output of the sequencing means 50, the stylus 34 (more exactly its tip 71) will be at ground potential, whereas if it touches any other segment, the stylus will be at Vcc.

The circuit can best be understood by considering it on the basis of the logic functions it performs. Following conventional logic terminology, the ground signal will be considered 0 and the supply voltage signal 1.

Also, as the comparator circuit is best understood in connection with an actual operating sequence, it will be described first for the sequence where the student performs as he is supposed to, namely, by scribing successively test points 46a–p in their alphabetical order.

As mentioned above, the student begins by pushing the pushbutton 48. Although the actual starting operation will be explained in greater detail below, it will suffice for the moment to know that this serves to reset the four-bit binary counter 66, grounding output point 1 of the 4 line to 16 line decoder 68 and hence segment 46p. Thus, when the student first touches segment 46a, as is proper, a 1 is detected at the stylus 34 and is transmitted over the cable 36 to the comparator circuit 52. The 1 is applied to input 1 of an inverter 70 which produces a 0 at its output 2. This signal is again inverted by an inverter 72 to produce a 1 which is applied to input 1 of a NAND gate 74. The 1 input to the comparator 5 is also applied through a diode 76 and a resistor 78 to input 5 of an inverter 80. The input 5 is also connected to ground through a resistor 82, which serves to make the input to the inverter 80 0 when it is not receiving an input signal from the cable 36. The input for the inverter 70 is also applied to a grounded capacitor 84 which serves to hold the incoming signals and eliminate spurious input signals such as switching transients. A 1 input to the inverter 80 produces a 0 at its output. The 0 is applied to an inverter 86 which again inverts the signal to 1 which is applied to the input 2 of the NAND gate 74. With both inputs of the NAND gate 74 at 1, its output is 0. This 0 output is applied to an inverter 88 which inverts the signal to a 1 and applies it to input 10 of a NAND gate 90. At the same time the 0 signals at the outputs of inverters 70 and 80 are applied respectively to inputs 4 and 5 of a NAND gate 92 which thereupon produces a 1 at its output. This signal is applied to input 9 of NAND gate 90. With both inputs of the NAND gate 90 at 1, the output at terminal 8 is 0.

It is at the output gate 8 of the NAND gate 90 that an error signal is developed. Under the conditions assumed above, segment 46p is grounded, but the stylus 34 is touching segment 46a. This is an apparent error. However, 46a is the segment that it is desired that the student touch first. What the student has done is touch the segment next following the grounded segment. Thus, the signal on pin 8 of the NAND gate 90 is not a true error signal.

The circuit includes means for telling a true error signal from an apparent error signal that is not a true error signal. To this end, a capacitor 94 is coupled between the ground and the output of the NAND gate 90. This delays the signal, and only after predetermined delay would the signal be applied to input 13 of an inverter 96, the output of which is the true error signal. Meanwhile, however, the 0 signal at the output of the NAND gate 74 is applied to a shunt capacitor 98, which smooths out line disturbances, and passes to terminal 14 of the four-bit binary counter 66 advancing its output to the next state, thereby grounding output point 2 of the 4 line to 16 line decoder 68 and hence grounding point 46a. This produces a 0 signal on cable 36 which indicates that the stylus 34 is touching the segment 46 corresponding to the current state of the sequencing means. This 0 signal is then inverted by the inverter 70 to a 1 and further inverted by the inverter 72 to a 0 thereby driving the output of the NAND gate 74 to a 1. The 1 is inverted by the inverter 88 to a 0 which produces a 1 at the output of the NAND gate 90 thereby cancelling the previous 0, or apparent error signal. The 1 output from the NAND gate 74 does not advance the counter 66. Therefore, 1 remains applied to the capacitor 94 and after delay appears at the input 13 of the inverter 96. The 1 is inverted by the inverter 96 to a 0 at the output 12 of the inverter 96. This is the true error signal, which under the assumed conditions is indicative of correspondence between the segment 46 touched by the stylus 34 and the state of the sequencing means 50. 1 at the output 12 of the inverter 96 would have indicated true error or lack of correspondence.

As the student advances the stylus 34 in proper sequence through segments 46a–p, the above-described steps are repeated, the comparator 52 first noting a potential error and switching the counter 66 to its next stage, thereby cancelling the error signal, until the student reaches the final segment 46p. The student is then back where he started with segment 46p grounded, whereupon the student may repeat the process.

In order that the student may be informed that he is performing properly, the signal from the NAND gate 92 is applied over a conductor 100 to a terminal 102 in the display unit 54. This, too, is an error or evaluation signal indicating correspondence or lack thereof between the position of the stylus 34 and the state of the sequencing means 50. As noted above, when the position of the stylus 34 is on the grounded segment 46, a 1 appears at the outputs of the inverters 70 and 80. When these 1's are applied to respective inputs 4 and 5 of the NAND gate 92, the output of the NAND gate 92 is 0, indicating a correct placement of the probe 34 by the student. A 0 signal on the conductor 100 therefore indicates proper performance. This signal is applied to the base of a PNP transistor 104 which is connected in series with a light-emitting diode 106 and a resistor 108, between the power supply Vcc and ground. (Diodes may be used instead of the resistor 108). The 0 signal on the conductor 100 turns on the PNP transistor 104, thus activating the light-emitting diode 106 which lights the lamp 56 indicating to the student that he is performing properly. As with the "error" signal at the output 3 of the NAND gate 74, the error signal at the output 6 of the NAND gate 92 momentarily indicates an error when the student moves to the next proper segment 46, producing a 1 at the stylus 34. This causes no difficulty here however, as the control signal for the transistor 104 is not set by a transient signal. That is, the transistor 104 goes off momentarily when the stylus 34 is advanced but comes back on as soon as the counter 66 advances to catch up. The action is so rapid as to cause no flicker preceivable by the student.

Upon the completion of each cycle of the four-bit binary counter 66, it returns to its "reset" condition, and a 0 is developed from each output thereof, including output 11. This 0 from output 11 is applied to the input of a four-bit binary counter 114 contained in the display unit 54. As with the other four-bit binary counter 66, the four-bit binary counter 114 is advanced by one state upon the application of each 0. The output of the four-bit binary counter 114 can be decoded to produce an output upon the receipt of any number of signals up to 16; however, when connected as illustrated in FIG. 3, a 1 output signal appears at pin 8 upon receipt of 4 0 signals applied to input 14. Thus, upon completion of four successful scribings of segments 45a–p in proper sequence, pin 8 develops a 1 signal which is applied through a resistor 116 to the base of an NPN transistor 118 connected in series with a light-emitting diode 120 and a resistor 122 between the power supply Vcc and ground. (Diodes may be used instead of the resistor 122.) The application of the 1 to the base of the transistor 118 turns on the transistor, completing the circuit from Vcc to ground and turning on the light-emitting diode 120, which provides the light for the lamp 58. At the same time, the 1 signal is inverted by a NAND gate 128 connected as an inverter, developing a 0 signal on the base of the transistor 104 irrespective of the signal from the NAND gate 92, thereby assuring that both lamps 56 and 58 are lit. This informs the student (and his teacher) not only that he is performing everything satisfactory but that he has performed satisfactorily the required number of times consecutively without intervening error. It is within the present invention that the display output be latched in this condition until the four-bit binary counter is reset and the apparatus restarted. However, in the circuit as shown, this has not proven necessary, as the lamp 58 remains on as the student correctly scribes four additional cycles and the student or his teacher will ordinarily note the correct completion of the prescribed number of cycles and stop the performance.

Going now to the operation of the device upon the occurrence of an actual error, in the event the student makes an improper selection of segments 46a–p, not only will a 1 appear on the cable 36 which then through inverters 70 and 72 and 80 and 86 produces a 0 signal at the output of NAND gate 74, but the consequent triggering of the counter 66 to advance the sequencing means 50 to its next state leaves the signal at 1 on the cable 36 and consequently at 0 at the output of the NAND gate 74 and 1 at input 9 of the NAND gate 90. At the same time, 1 on the cable 36 produces 0 outputs from inverters 70 and 80, whereupon the output of the NAND gate 92 goes to 1 turning off the light-emitting diode 106 and consequently turning off the lamp 56, thereby indicating to the student that he has erred. This also applies a 1 to the other input 10 of the NAND gate 90, producing a 0 at its output and a true 1 error signal at the output of the inverter 96. This resets the four-bit binary counters 66 and 114 by applying positive reset signals to their respective terminals 2 and 3. Further, in a manner described below in connection with the power supply 60, the power supply is turned off by the true error signal, disabling the device until the pushbutton 48 is again operated.

In addition to the two conditions mentioned above, one where the stylus 34 is touching the grounded segment 46a–p and the other where it is touching an energized segment 46a–p, there is a third condition which is related to both erroneous and correct responses. That condition is when the stylus 34 is not touching any segment at all. That condition obtains in the normal course of proper scribing at the beginning and end of each line 38, 40, 42 and 44. On the other hand, it also obtains when the student lifts the stylus or gets off the line in making an erroneous trace. With the circuit illustrated, such condition is counted as neither right nor wrong, unless persisted in. It will neither reset nor advance the four-bit binary counters 66 and 114. It does, however, turn off the lamp 56. These are the functions of the inverters 80 and 86, diode 76 and resistors 78 and 82.

When the stylus 34 is not touching a segment 46a-p, it is neither grounded nor at the supply voltage Vcc. It may be said to be floating. However, in the circuit illustrated, the operation of the particular inverter 70 requires at its input passing current of one milliampere to ground. In the absence of ground or the supply voltage Vcc on the stylus 34, a positive voltage is developed on the input which is sufficient to register as a 1. This signal is developed across the series connection of the diode 76 and resistors 78 and 82 to ground. The resistor 82 connected directly to ground has substantially less resistance than that of the other resistor 78. Because of this and the voltage drop across the diode 76, the input to the inverter 80 in the floating condition is much less than the input to the inverter 70. The relative resistances of the resistors 78 and 80 and the drop across the diode 76 are empirically determined to cause the floating condition to register as a 0 at the input to the inverter 80 while registering as a 1 at the input to the inverter 70. Resistances of 1,800 ohms and 910 ohms have been found suitable for the resistors 78 and 82, respectively.

Under such conditions, 1 appears at the output of the inverter 80, 0 being thereby produced at the output of the inverter 86 and 1 at the output of the NAND gate 74, indicating no error and hence not actuating the four-bit binary counter 66. This is inverted to 0 by the inverter 88, making the output of the NAND gate 90 1; this is inverted to 0 by the inverter 96, indicating no error and hence not resetting the four-bit binary counters 66 and 114. At the same time 0 appears at the output of the inverter 70, thereby producing 1 at the output of the NAND gate 92 which turns off the transistor 104 and hence the lamp 56. The floating condition of the stylus 34 thus turns off the lamp 56, indicating to the student that he is not touching the proper segment 46a–p but it does not advance or reset the four-bit binary counters 66 and 114. If the student responds by touching the appropriate segment, the circuit operates as described above. Should the student fail to touch the proper segment within a predetermined time, the circuit is disabled by turning off the power supply 60, as described below in greater detail.

For the sake of conserving battery power when the apparatus is not in use, the power supply 60 may take the form illustrated in FIG. 3, wherein the power is derived from a battery 130 which is connected between the ground terminal 64 and the Vcc output terminal 62 through a PNP transistor 132. When the student depresses the pushbutton 48, the pushbutton closes switches 134 and 136. The pushbutton is preferably spring loaded to open the switches 134 and 136 when the pushbutton 48 is released. CLosing of the switch 136 grounds the input to the inverter 96, producing a 1 signal at the output 12 of the inverter 96 which, like a true error signal, resets the four-bit binary counters 66 and 114. Closure of the switch 134 applies 6 volts or a 1 signal through a resistor 138 to the base of an NPN transistor 140, turning on the transistor 140. This completes a circuit between the positive terminal of the battery 130 and ground through a capacitor 142, a resistor 144 and a diode 146, thus charging the capacitor 142 to the voltage of the battery 130. Switches 136 and 134 are thereafter opened upon release of the pushbutton 48. The voltage on the capacitor 142 is applied through a resistor 148 to the base of a PNP transistor 150 which is a part of a Darlington circuit also including a PNP transistor 152 and series resistors 154 and 156. With the Darlington circuit turned on, the current through the resistor 154 develops a biasing voltage for the transistor 132, turning on the transistor 132 and applying the potential of the battery 130 to the Vcc output terminal 62.

A resistor 158 is connected in shunt of the capacitor 142 and therefore acts to discharge it when the charging circuit is opened. In time, the voltage on the capacitor 142 becomes insufficient to keep the Darlington circuit on, and the transistor 132 is thereupon turned off, disconnecting Vcc output terminal 62 from the battery and, consequently, substantially stopping the drain on the battery. The length of time before the voltage on the capacitor 142 drops sufficiently to turn off the Darlington circuit depends, of course, upon the RC time constant of the circuit comprising the resistor 158 and the capacitor 142. Preferably, a time constant is provided that will disconnect Vcc output terminal 62 from the battery 130 after about 30 seconds, giving the student sufficient time to take action.

Once the student takes action and moves the stylus 34 to the next proper segment 46a–p, the sequencing means 50 moves to its next state, resulting in a 0 signal on the cable 36 with a consequent 1 signal at the output of the inverter 70. This 1 or positive signal is applied through a resistor 160 to the base of an NPN transistor 162 which is connected in parallel with the transistor 140. The positive signal applied to the base of the transistor 162 turns it on, recharging the capacitor 142 to its full charge each time the student makes a correct move, just as it was originally charged when the transistor 140 was turned on. This restarts the time for the power supply 69 to remain on. This gives the student time to go from line to line in the floating condition described above, while disabling the circuit if he waits too long. The corollary to this is that the power supply 60 goes off, disabling the circuit, whenever the student does not continue making correct responses, even when he does not make a sequencing error. The delay in turning off the power supply keeps the lamps 56 and 58 lit for a time after the proper completion of the prescribed number of sequences, giving any supervisor time to observe what the student has achieved, before the power goes off.

Should the student make an error in sequence, the consequent 1 signal at the output of the inverter 96 is applied through a differentiating capacitor 164 and resistor 166 to the base of an NPN transistor 168 which is connected in series with resistors 170 and 172 across the battery 130. The positive signal applied to the base of the transistor 168 turns it on, thereby developing a voltage across the resistor 170 which is applied to the base of a PNP transistor 174 to turn on the transistor 174. The transistor 174 is connected across the capacitor 142 through a resistor 176. Thus, when the transistor 174 is turned on, the capacitor 142 is discharged through the resistor 176. The resistor 176 has much less resistance than the resistor 158 and consequently discharges the capacitor 142 relatively instantaneously, thus turning off the transistor 132 and decoupling the battery 130 from the Vcc output terminal 62. Thus, the battery 130 is turned off by a wrong move by the student as well as upon the passage of a predetermined time without touching the proper segment, whichever first occurs.

The input to the base of the transistor 168 is through the capacitor 164, and the base is connected to ground through a resistor 178. The transistor 168 is thus triggered by a positive going transition or from the output of the inverter 96 and would immediately go off were it not held on by other means. That means is the series connection of a capacitor 184 and a resistor 186 connected between the collector of the transistor 174 and the base of the transistor 168. This provides the flow of current through the resistor 178, keeping transistors 168 and 174 on, until the capacitor 184 is charged. The duration of the period the transistors 168 and 174 are kept on depends upon the time constant of the circuit as may be determined by selection of an appropriate capacitance for the capacitor 184. 0.1 to 0.2 seconds has been found long enough for discharging the capacitor 142 to turn off the power supply. On the other hand, this time is short compared to the time for operation of the pushbutton 48 so that, although closing of the switch 136 develops a positive pulse to turn on the transistors 168 and 174, they are turned off before the pushbutton 48 is released, thus leaving the capacitor 142 fully charged.

Resistors 180 and 182 are connected respectively between ground and the bases of the respective transistors 162 and 140, thus assuring grounding of the respective bases and the turning off of the respective transistors when no signals are applied.

Various modifications may be made in the device within the scope of the present invention. Other logic circuits may be used to produce the same or similar results. For example, by modification of the circuitry, the sequencing means 50 may be caused to change state in advance of the movement of the stylus 34. In that case, when the comparator senses that the position of the stylus 34 corresponds to the state of the sequencing means 50, an evaluation signal indicating correctness is derived. That signal is then latched to preserve it until the stylus is moved another segment 46, and at the same time the comparator triggers the sequencing means 50 to cause it to go to its next state. If the student moves to the next correct segment, the process is repeated. It is upon moving to the wrong segment that the comparator senses lack of correspondence between stylus position and the state of the sequencing means and passes an evaluation signal to the display unit to cause it to indicate to the student that he has erred.

Although the preferred embodiment of the invention includes a visual display unit 54, other information feedback means may be used, such as means providing aural signals.

The digital logic system as shown and described is in the form of diode-transistor logic (DTL) and transistor-transistor logic (TTL). Other forms of digital logic may be used.

In the particular preferred form of the invention shown and described, the position of a conductive stylus relative to conductive segments was sensed to provide stimulus for the logic system. The apparatus may be modified to sense the position of other styli or even the position of the student's finger. It may be modified to sense position other than by conduction, as for example, by changes in capacitance, or by the presence of heat or light or a magnetic field.

Other variations may be made by those skilled in the art without departing from the spirit and scope of the invention.

What is claimed is:

1. A directionality trainer for training a student in sequential perceptual-motor scribing responses in association with the graphic symbols of a given language, said trainer comprising: a visual-kinesthetic sequence tracing board having graphic symbols visible to the student written thereon in accordance with the spatial conventions of the given language, the surface of the board having a plurality of stations thereon touchable by the student and associated with respective portions of said written matter and spatially arranged in the same manner and sequence as said written matter, sequencing means for providing successively a plurality of unique output states each corresponding to a respective one of said stations, said sequencing means operating when actuated to advance successively from state to state in the same sequence as the corresponding stations are arranged, comparator means for comparing the state of said sequencing means with the station touched by the student, and in response to such comparison actuating the sequencing means and producing an evaluation signal indicating whether or not the student is touching the stations in conventional sequence, and information feedback means responsive to said evaluation signal for producing a feedback signal apprising the student whether or not he is performing appropriately.

2. A directionality trainer for training a student in sequential perceptual-motor scribing responses in association with the graphic symbols of a given language, said trainer comprising: a visual-kinesthetic sequence tracing board having graphic symbols visible to the student written thereon in accordance with the spatial conventions of the given language, the surface of the board having a plurality of discrete segments thereof touchable by the student and associated with respective portions of said written matter and spatially arranged in the same manner and sequence as said written matter, sequencing means for providing successively a plurality of unique output states each corresponding to a respective one of said board segments, said sequencing means operating each time it is actuated to advance successively from state to state in the same sequence as the corresponding segments are arranged, comparator means for comparing the state of said sequencing means with the board segment touched by the student, and in response to such comparison actuating the sequencing means once and producing an evaluation signal indicating whether or not the student is touching the segments in conventional sequence, and information feedback means responsive to said evaluation signal for producing a feedback signal for apprising the student whether or not he is performing appropriately.

3. The directionality trainer of claim 2 wherein said comparator means comprises means for acting upon failure of the touched segment to correspond to the state of said sequencing means to actuate said sequencing means once to advance said sequencing means to its next successive state, and means for delaying determination of error until after said sequencing means thereupon changes state, whereby proper sequence is indicated by the evaluation signal so long as the student moves from the segment corresponding to the state of said sequencing means to the segment corresponding to its next successive state.

4. The directionality trainer of claim 2 wherein said comparator means includes means for acting upon failure of the student to touch any segment to produce an evaluation signal indicative of error without actuating said counter.

5. The directionality trainer of claim 2 wherein said segments are disposed in a plurality of discrete lines on said visual-kinesthetic sequence training board and said graphic symbols are printed on said segments.

6. The directionality trainer of claim 5 wherein said visual-kinesthetic sequence training board includes guide means adjacent each of said lines of segments for guiding the student's touching of successive segments.

7. The directionality trainer of claim 2 wherein said information feedback means includes means responsive to said evaluation signal for providing one feedback signal to the student indicating that he is performing appropriately, and means coupled to said sequencing means for identifying the completion of a complete proper sequence and providing another feedback signal to the student upon the completion of a predetermined number of complete proper sequences.

8. The directionality trainer of claim 7 wherein said information feedback means provides visual signals to the student.

9. The directionality trainer of claim 2 wherein said segments comprise metallic members insulated from one another, said sequencing means comprises a digital counter, and said comparator means comprises an electronic digital logic circuit.

10. The directionality trainer of claim 9 including means comprising a manually operable electrically conductive stylus by which the student touches said segments for providing an electronic position dependent signal to said comparator means.

11. The directionality trainer of claim 10 wherein said sequencing means includes means for providing a state indicating potential to the one of said segments corresponding to the state of said sequencing means while providing a different potential to the rest of said segments; and said comparator means includes means for actuating said sequencing means once in response to the signal developed by said stylus only when said stylus touches a segment to which said different potential is provided, and means for delaying said evaluation signal until after said sequencing means thereupon changes state, whereby said evaluation signal indicates proper sequence when said stylus is touching the segment to which said state indicating potential is applied after said sequencing means has changed state.

12. The directionality trainer of claim 10 wherein the electronic circuitry thereof is electrically powered, and means are provided for supplying power so long as the stylus touches the segment corresponding to the state of the sequencing means and thereafter turning off the power upon the lapse of a predetermined time or the touching of the stylus to any other segment except that corresponding to the next subsequent state of the sequencing means, whichever first occurs.

13. The directionality trainer of claim 2 including manually operated start means for placing said sequencing means in a starting state wherein the touching of the segment corresponding to the beginning of the written matter produces an evaluation signal indicating that the student is proceeding in conventional sequence.

14. The directionality trainer of claim 1 wherein said comparator means includes means for producing a reset signal when a segment is touched out of conventional sequence, and said sequencing means includes means responsive to said reset signal for placing said sequencing means in said starting state.

15. The directionality trainer of claim 13 wherein said starting state is the state corresponding to the segment corresponding to the end of the written matter.

16. The directionality trainer of claim 13 wherein said sequencing means is in said starting state upon the student's completion of touching said segments in a proper sequence.

* * * * *

UNITED STATES PATENT OFFICE
CERTIFICATE OF CORRECTION

Patent No. 3,774,318      Dated November 27, 1973

Inventor(s) Graham M. Sterritt

It is certified that error appears in the above-identified patent and that said Letters Patent are hereby corrected as shown below:

Abstract page, last name "Sterriti" should read --Sterritt--;

Column 1, lines 58 and 59, "pre-shcool" should read --pre-school--;

Column 4, lines 14 and 15, "consitutes" should read --constitutes--;

Column 4, line 41, after "advances" insert --when actuated--;

Column 5, line 27, "5" should read --52--;

Column 5, line 48, "gate 8" should read --terminal 8--;

Column 5, line 57, "telling" should read --discriminating--;

Column 6, line 16, "error" should read --"error"--;

Column 7, line 9, "45a-p" should read --46a-p--;

Column 7, line 25, "satisfactory" should read --satisfactorily--;

Column 7, line 45, "9" should read --10--;

Column 7, line 51, "10" should read --9--;

Column 8, line 25, "80" should read --82--;

Column 9, line 43, "69" should read --60--;

Column 10, line 12, after "or" insert --1--;

Column 10, line 32, change "Resistors 180" to --Resistor 180 and the series connection of resistors 138--;

Column 13, line 5 (Claim 14), change "1" to --13--.

Signed and sealed this 16th day of April 1974.

(SEAL)
Attest:

EDWARD M. FLETCHER, JR.
Attesting Officer

C. MARSHALL DANN
Commissioner of Patents